United States Patent
Yasui et al.

(10) Patent No.: US 7,312,594 B2
(45) Date of Patent: Dec. 25, 2007

(54) CONTROL SYSTEM FOR SYNCHRONOUS MACHINE

(75) Inventors: Kazuya Yasui, Tokyo (JP); Kazuaki Yuuki, Saitama-ken (JP); Kentaro Suzuki, Tokyo (JP); Katsumi Maekawa, Saitama-ken (JP); Shouji Onda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 11/259,367

(22) Filed: Oct. 27, 2005

(65) Prior Publication Data
US 2006/0097686 A1 May 11, 2006

(30) Foreign Application Priority Data
Oct. 27, 2004 (JP) .............................. 2004-312225

(51) Int. Cl.
H02P 1/46 (2006.01)
(52) U.S. Cl. ...................... 318/700; 318/705; 318/718; 318/254
(58) Field of Classification Search ...................... None
See application file for complete search history.

(56) References Cited

U.S. PATENT DOCUMENTS

| | | | | |
|---|---|---|---|---|
| 5,796,231 A * | 8/1998 | Kyodo | ......................... | 318/608 |
| 6,555,988 B2 * | 4/2003 | Masaki et al. | ............... | 318/721 |
| 6,636,012 B2 * | 10/2003 | Royak et al. | ................ | 318/727 |
| 6,788,024 B2 * | 9/2004 | Kaneko et al. | .............. | 318/807 |
| 6,801,011 B2 * | 10/2004 | Ide | .............................. | 318/700 |
| 6,812,659 B2 * | 11/2004 | Imai et al. | ................... | 318/254 |
| 6,812,660 B2 * | 11/2004 | Takahashi et al. | ........... | 318/254 |
| 6,869,272 B2 * | 3/2005 | Odachi et al. | .............. | 417/44.1 |
| 6,900,604 B2 * | 5/2005 | Kokami et al. | .............. | 318/254 |
| 2004/0232862 A1 * | 11/2004 | Wogari et al. | ............... | 318/254 |
| 2005/0189892 A1 * | 9/2005 | Kokami et al. | .............. | 318/254 |

FOREIGN PATENT DOCUMENTS

| JP | 08-205578 A | 8/1996 |
|---|---|---|
| JP | 2006180567 A * | 7/2006 |

OTHER PUBLICATIONS

Ogasawara, S. et al., "A Position-Sensorless IPM Motor Drive System Using a Position Estimation Based on Magnetic Saliency," T. IEEE Japan, vol. 118-D, No. 5, 1998, pp. 652-660.

* cited by examiner

Primary Examiner—Lincoln Donovan
Assistant Examiner—Eduardo Colon Santana
(74) Attorney, Agent, or Firm—Foley & Lardner LLP

(57) ABSTRACT

A control system for a synchronous machine including a converter for converting DC voltage to AC voltage or AC voltage to DC voltage. The synchronous machine is driven by the converter. The control system further includes a magnetic pole position presuming device for performing a presuming operation to presume a magnetic pole position of the synchronous machine based on high-frequency components of a voltage applied to the synchronous machine and a current flowing into the synchronous machine, and a control device for controlling the converter based on the magnetic pole position presumed by the magnetic pole position presuming device. The control device controls the converter so as to contain significant high-frequency components in the voltage or the current used in the presuming operation when a mean voltage or a mean current output from the converter is spatially in a region close to a straight line containing starting and ending points of non-zero voltage vector output from the converter.

5 Claims, 5 Drawing Sheets

CONTROL SYSTEM FOR SYNCHRONOUS MACHINE

CROSS-REFERENCE TO RELATED APPLICATIONS

This application is based upon and claims the benefit of priority from the prior Japanese Patent Application No. 2004-312225, filed on Oct. 27, 2004; the entire contents of which are incorporated herein by reference.

BACKGROUND OF THE INVENTION

1. Field of the Invention

The present invention relates to a control system for a synchronous machine, and more particularly to a control system for a synchronous machine, such as a synchronous motor or a synchronous generator, capable of detecting a magnetic pole position (a rotation angle) of a rotor of the synchronous machine without using a magnetic pole position detector.

2. Description of the Background

A control system for a synchronous machine needs a detector to detect a magnetic pole position (a rotation angle) of a rotor for controlling the drive of a synchronous machine (a synchronous motor, a synchronous generator). However, a synchronous machine driving device using such a detector has problems shown below as examples. First, the presence of a detector increases a volume of a synchronous machine using a detector, and this will impede to increase the output of a synchronous machine. Secondly, the maintenance and inspection work of a synchronous machine itself become necessary. This will make the efficiency of the maintenance and inspection worse. Thirdly, noises will be superposed on a signal line from a detector, and as a result, a detected value will be disturbed, and the control efficiency will become worse. Fourthly, a detector needs a power source for driving itself in most cases, and in addition to the power source for driving a synchronous machine, a separate power source must be provided. This will become factors for increase in a space for installing a power source, a power feed line, cost, etc.

For the reasons mentioned above, a control system for presuming a magnetic pole position without using a detector and making the drive control according to the presumed magnetic pole position is developed. This control system is called as the "Sensor-less control".

As a control system for a synchronous machine equipped with such the sensor-less control means, one example thereof is described below. In a system for driving a synchronous machine, a changed portion of the output current generated by the PWM control and an integral time value of the output voltage generated by the PWM control are detected in synchronism with the PWM switching, and a magnetic pole position is detected according to the current/voltage equation of a synchronous machine using these detected values. (Refer to, for example, Patent Document 1)

[Patent Document 1] Patent Gazette No. 3312520

In the above-mentioned control system for a synchronous machine, it is necessary to particularly control the synchronous machine to generate the high-frequency components by the PWM control in order to presume a magnetic pole position of a synchronous machine by using the high-frequency components of the voltage and the current generated from the PWM control (described in Claims 4 and 5 of Patent Document 1). Therefore, it was a problem that the power loss and the noise are increased resulting from the high-frequency components as a result of such the control.

SUMMARY OF THE INVENTION

One object of the present invention is to provide a control system for a synchronous machine that is capable of surely presuming a magnetic pole position while minimizing the power loss and the noise resulting from the high-frequency components.

One aspect of the invention is to provide a control system for a synchronous machine including a converter for converting DC voltage to AC voltage or AC voltage to DC voltage. The synchronous machine is driven by the converter. The control system further includes a magnetic pole position presuming device for performing a presuming operation to presume a magnetic pole position of the synchronous machine based on high-frequency components of a voltage applied to the synchronous machine and a current flowing into the synchronous machine, and a control device for controlling the converter based on the magnetic pole position presumed by the magnetic pole position presuming device. The control device controls the converter so as to contain significant high-frequency components in the voltage or the current used in the presuming operation when a mean voltage or a mean current output from the converter is spatially in a region close to a straight line containing starting and ending points of non-zero voltage vector output from the converter.

One aspect of the invention is to provide a control system for a synchronous machine including a converter for converting DC voltage to AC voltage or AC voltage to DC voltage. The synchronous machine is driven by the converter. The control system further includes a magnetic pole position presuming device for performing a presuming operation to presume a magnetic pole position of the synchronous machine based on high-frequency components of a voltage applied to the synchronous machine and a current flowing into the synchronous machine, and a control device for controlling the converter based on the magnetic pole position presumed by the magnetic pole position presuming device. The control device controls the converter so as to contain significant high-frequency components in the voltage or the current used in the presuming operation when the magnetic pole position presuming device detects that the presuming operation is abnormal.

One aspect of the invention is to provide a control system for a synchronous machine including a converter for converting DC voltage to AC voltage or AC voltage to DC voltage. The synchronous machine is driven by the converter. The control system further includes a magnetic pole position presuming device for performing a presuming operation to presume a magnetic pole position of the synchronous machine based on high-frequency components of a voltage applied to the synchronous machine and a current flowing into the synchronous machine, and a control device for controlling the converter based on the magnetic pole position presumed by the magnetic pole position presuming device. The control device controls the converter so as to include high-frequency components of a voltage or a current spatially in the direction at least orthogonal to the high-frequency components of the voltage or the current used in the presuming operation when no vector satisfying the linearly independent condition is contained in the high-frequency components of the voltage or the current used in the presuming operation.

One aspect of the invention is to provide a control system for a synchronous machine including a converter for converting DC voltage to AC voltage or AC voltage to DC voltage. The synchronous machine is driven by the converter. The control system further includes a magnetic pole position presuming device for performing a presuming operation to presume a magnetic pole position of the synchronous machine based on high-frequency components of a voltage applied to the synchronous machine and a current flowing into the synchronous machine, and a control device for controlling the converter based on the magnetic pole position presumed by the magnetic pole position presuming device. The control device controls the converter such that the high-frequency components of the voltage or the current used in the presuming operation become two or more vectors which are spatially linearly independent and have values above a specified value when the high-frequency components of the voltage or the current used in the presuming operation are below the specified value.

According to the present invention, it is possible to surely presume a magnetic pole position while minimizing the power loss and the noise resulting from the high-frequency components.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
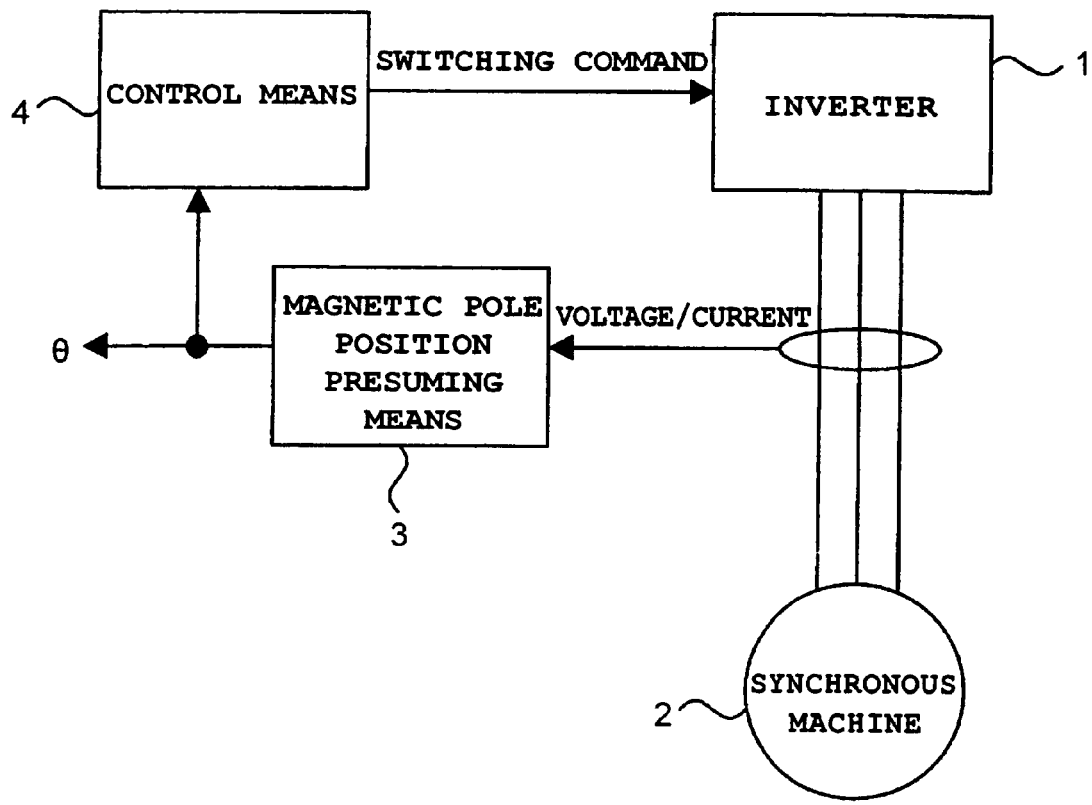
FIG. 1 is a block diagram showing the schematic construction of a first embodiment of this invention.

Referring now to the drawings, wherein like reference numerals designate identical or corresponding parts throughout the several views, the embodiments of this invention will be described below.

First Embodiment

FIG. 1 is a diagram showing a schematic structure of a control system for a synchronous machine according to a first embodiment of the present invention. In FIG. 1, a converter such as an inverter 1, a synchronous machine 2, a magnetic pole position presuming means 3 and a control means 4 are shown. Here, θ is a magnetic pole position presumed by the magnetic pole position presuming means 3.

The inverter 1 is a device to reversely convert DC voltage into AC voltage and makes the switching based on a PWM switching command input from the control means 4.

In FIG. 1, the magnetic pole position presuming means 3 detects a voltage applied to the synchronous machine 2 and a current flowing into the synchronous machine 2, and presumes the magnetic pole position θ of the synchronous machine 2 based on the high-frequency components of these detected voltage and current. However, as the voltage or the current used for the presuming operation, it is possible to carry out an operation for such the voltage and the current based on the voltage/current equation of the synchronous machine 2 using a PWM switching command, DC voltage of the inverter 1, a synchronous machine parameter. Further, the high-frequency components are used for the presuming operation. Here, the voltage/current detected in synchronism with the PWM switching of the inverter 1 as described in the Patent Document 1 may be used, or the voltage/current detected independently from the PWM switching or asynchronously may also be used. When the voltage/current are detected asynchronously with the PWM switching, it becomes possible to operate the high-frequency components of voltage/current by a detecting means with a sampling frequency that is higher than the switching frequency.

Figure 2:
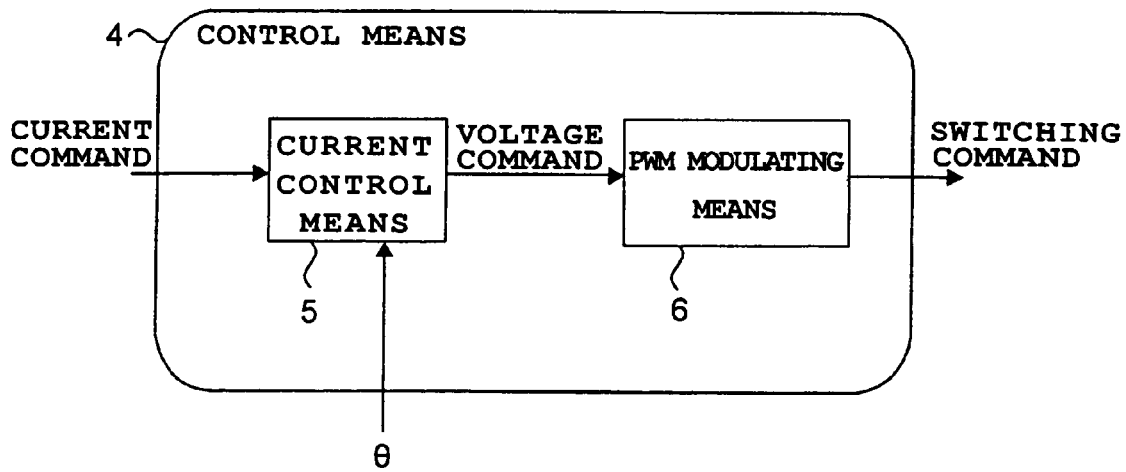
FIG. 2 is a block diagram showing a general construction of the control means 4 shown in FIG. 1.

As shown in FIG. 2, the control means 4 is generally in such a structure that a current command is input to a current control means 5 so as to control a torque and a rotation velocity of the synchronous machine 2, and a voltage command is operated and output by the current control means 5. Here, the magnetic pole position θ presumed by the magnetic pole position presuming means 3 is input to the current control means 5. Then the voltage command is modulated by a PWM modulating means 6, and thus a switching command is output to the inverter 1.

Figure 3:
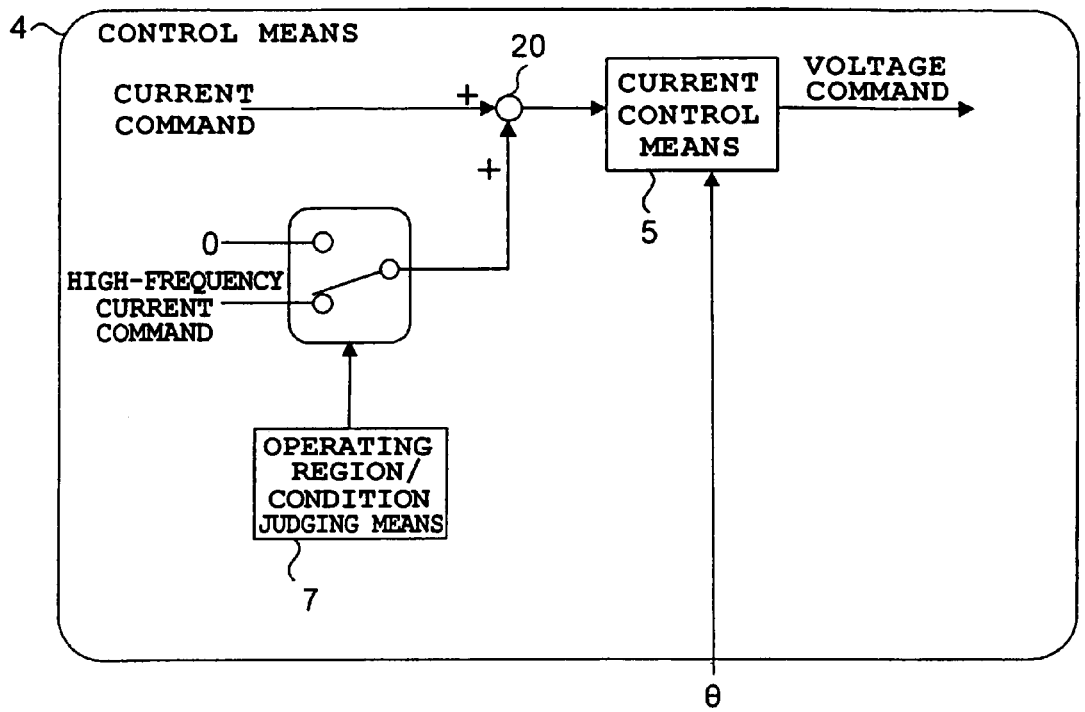
FIG. 3 is a block diagram showing an example of the construction of the control means 4 in the first embodiment.
Figure 4:
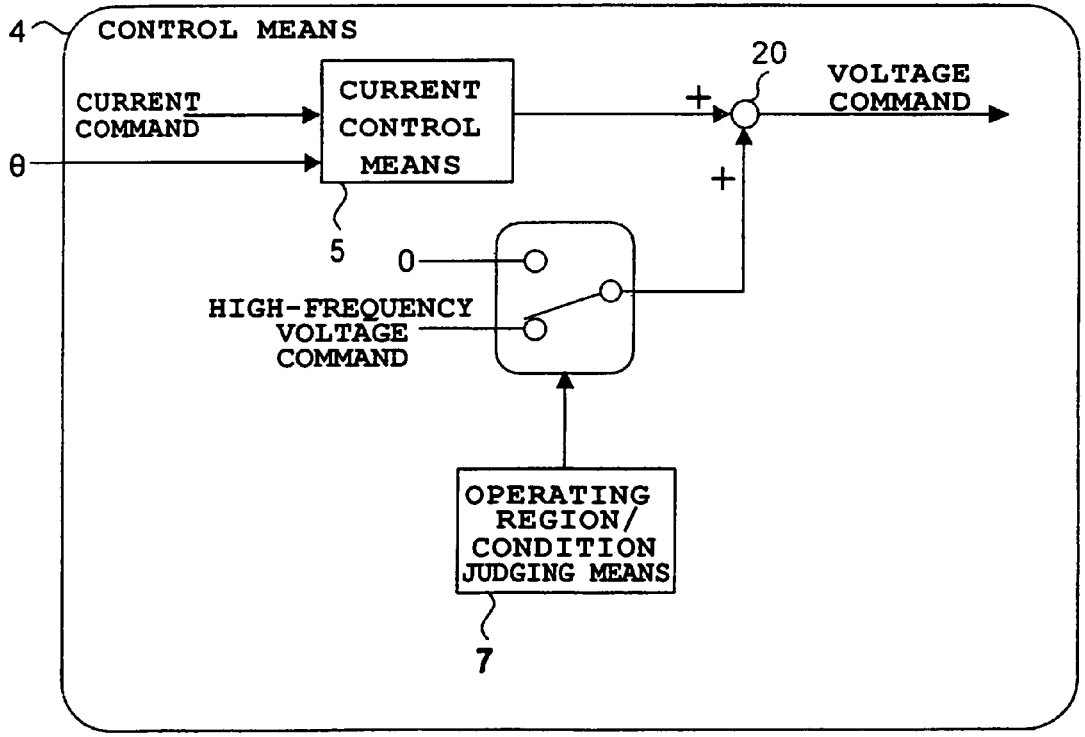
FIG. 4 is a block diagram showing another example of the construction of the control means 4 in the first embodiment.

As shown in FIG. 3 or FIG. 4, the control means 4 in this embodiment is further provided with an operating region/condition judging means 7 and an adder 20. To the adder 20, the current command and a high-frequency current command are input as shown in FIG. 3. In FIG. 4, an output of the current control means 5 and a high-frequency voltage command are input. Further, the structure of the control means 4 shown in FIG. 3 or FIG. 4 is able to obtain the effects described later according to either construction.

That is, the magnetic pole position presuming method used in this embodiment presumes a magnetic pole position based on the high-frequency components of voltage/current generated by the PWM, and has a condition that the presuming operation is possible only when the vectors of the applicable high-frequency components detected or operated have a linearly independent relation in the stator coordinate system of the synchronous machine 2.

However, when the synchronous machine 2 is operated by the inverter 1, the above-mentioned high-frequency vectors may become in the linearly dependent relation in some operating regions or conditions. In such the case, it is not possible to presume a magnetic pole position of the synchronous machine 2. The state where the presuming is disable is not preferred in the control of the synchronous machine 2. Therefore, it is necessary to avoid this state or recover from this state so that this state does not continue for a long time. In this embodiment, it is possible to avoid the state not able to presume a magnetic pole position or to recover from the state by superposing a high-frequency command so that the high-frequency components used in the presuming operation become linearly independent in the effective and simple structure.

Further, the high-frequency voltage or high-frequency current superposing method described in this embodiment is one example. Another method for the modulation so as to obtain the similar effect in the PWM modulating operation is also considered. For example, for the triangular wave comparative type PWM, the methods shown in Non-Patent Document 1 and so on may be considered.

(Non-Patent Document 1) "Position Sensor-less IPM Motor Driving System using Position Presuming Method based on magnetic saliency" (T. IEE Japan, Vol. 118-D, No. 5, '98).

In the method described in Non-Patent Document 1, when the prescribed voltage V is to be output, an operation is made during the PWM modulation so as to obtain a desired voltage V by selecting one of a plurality of the predetermined patterns of the spatial voltage vectors and changing the output time ratio of the spatial voltage vectors in the selected pattern.

In such the structure of the PWM modulation as described above, a conventional control method is usable at the stage before the PWM modulation.

Figure 5:
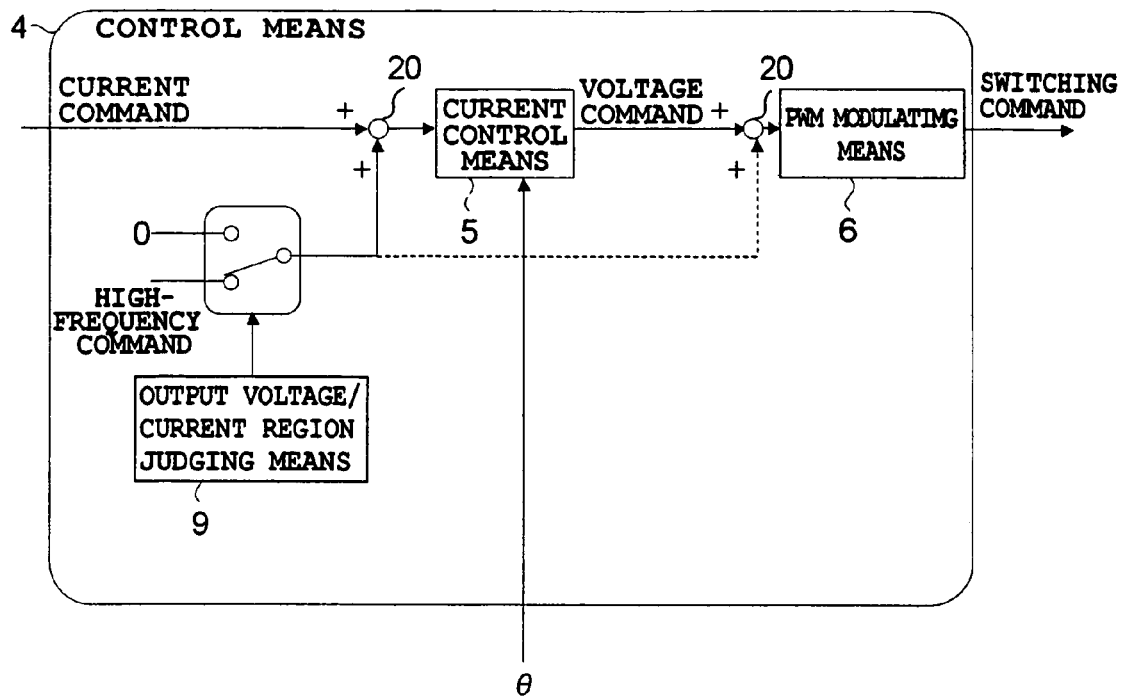
FIG. 5 is a block diagram showing an example of the definite construction of the control means 4 in the first embodiment.

Next, a definite example of the operating region/condition judging means 7 in this embodiment will be explained referring to FIG. 5 and FIG. 6. That is, as the operating region/condition judging means 7, an output voltage/current region judging means 9 as shown in FIG. 5 is used, which judges whether the mean voltage or the mean current output from the inverter 1 is in a region near the non-zero voltage vectors spatially switched from the inverter 1. And the voltage/current region judging means 9 operates to input a high-frequency command (a high-frequency current command or a high-frequency voltage command) to the adder 20 when it is judged that the mean voltage or the mean current is in the region near the non-zero voltage vectors. Here, a high-frequency voltage commend is used as a high-frequency command, and it is shown in dotted lines.

In this embodiment constructed as described above, only when the mean output voltage or the mean output current is in the region near the non-zero voltage vector spatially switched from the inverter 1, a high-frequency command can be superposed.

Figure 6:
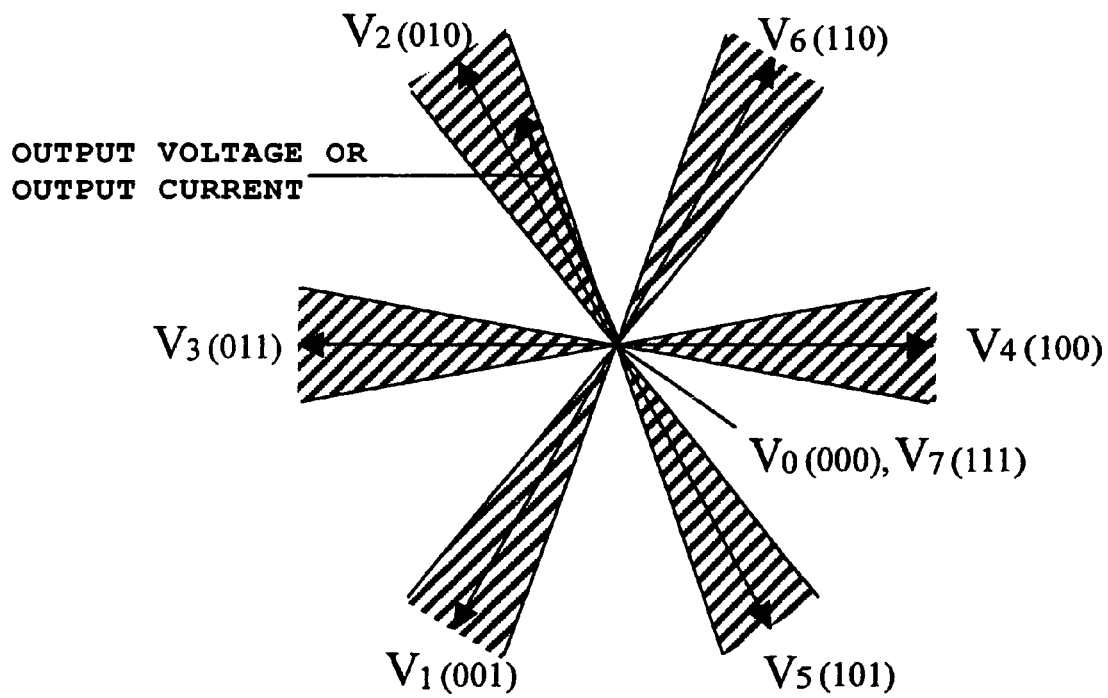
FIG. 6 is a regional diagram in a vector space for explaining an operation of the first embodiment.

In the operating region satisfying the above-mentioned conditions is, for example, shaded regions shown in FIG. 6 when spatially observed. In such the region, there is a high ratio to output total two kinds of vectors including one of non-zero voltage vectors V1(001), V2(010), V3(011), V4(100), V5(101) and V6(110) and zero voltage vectors V0(000) and V7(111) by the PWM switching. Even in the state wherein two non-zero voltage vectors are expected to be output, the output ratio of one of the non-zero voltage vectors becomes high and the other output ratio becomes extremely low. As a matter of course, the current change associated with the voltage vector of the low output ratio is small. In such state, it means that it becomes difficult to observe and operate the high-frequency components that are necessary for the magnetic pole position presuming operation. And the linearly independent condition of high-frequency components is not satisfied due to the influence of noise and the measuring resolution of the equipment, and the presuming operation tends to become impossible.

However, according to this embodiment, it becomes possible to avoid the state wherein the presuming operation is not feasible or to recover from the state by effectively superposing the high-frequency command, when the output voltage or the output current is included in the shaded regions shown in FIG. 6.

That is, when the output voltage or the output current is not included in the shaded regions in FIG. 6, the high-frequency command is not superposed and the magnetic pole position $\theta$ presumed in the magnetic pole position presuming means 3 is input to the current control means 5 for the PWM control of the synchronous machine 2. But, when the output voltage or the output current is included in the shaded regions in FIG. 6, the high-frequency command is superposed so that the presuming operation becomes feasible. As a result of such control, the output voltage or the output current becomes not included in the shaded regions in FIG. 6, and thus the magnetic pole position $\theta$ presumed in the magnetic pole position presuming means 3 based on such the output voltage or the output current is input to the current control means 5 for the PWM control of the synchronous machine 2.

Further, one of the regions shown in FIG. 6 is a region within ±10° separated from each non-zero voltage vector. The figure and size of these regions may be adjustable properly by taking the influences of above-mentioned noise, the measuring resolution of the equipment into consideration.

As explained above, in this embodiment, the synchronous machine 2 can be controlled while changing whether or not the high-frequency voltage command or the high-frequency current command is to be added according to the prescribed operating region and conditions of the synchronous machine 2; that is, whether or not the mean output voltage or the mean output current is spatially in a region near the non-zero voltage vector switched from the inverter 1.

According to this embodiment, since the high-frequency voltage or the high-frequency current can be superposed as necessary depending on the prescribed operating region, conditions and etc. of the synchronous machine without superposing the high-frequency voltage or the high-frequency current unnecessarily, it is possible to suppress the power loss/noise increase resulting from the high-frequency components.

Further, the explanation described above is made for the case that the synchronous machine 2 is a synchronous motor. When the synchronous machine 2 is a synchronous generator, the explanation can be applied similarly by regarding the inverter 1 as a rectifier.

Second Embodiment

Next, a control system for a synchronous machine according to a second embodiment of this invention will be explained referring to FIG. 7. Further, the same components as those of the first embodiment will be assigned with the same reference numerals, and the duplicate explanation thereof will be omitted.

Figure 7:
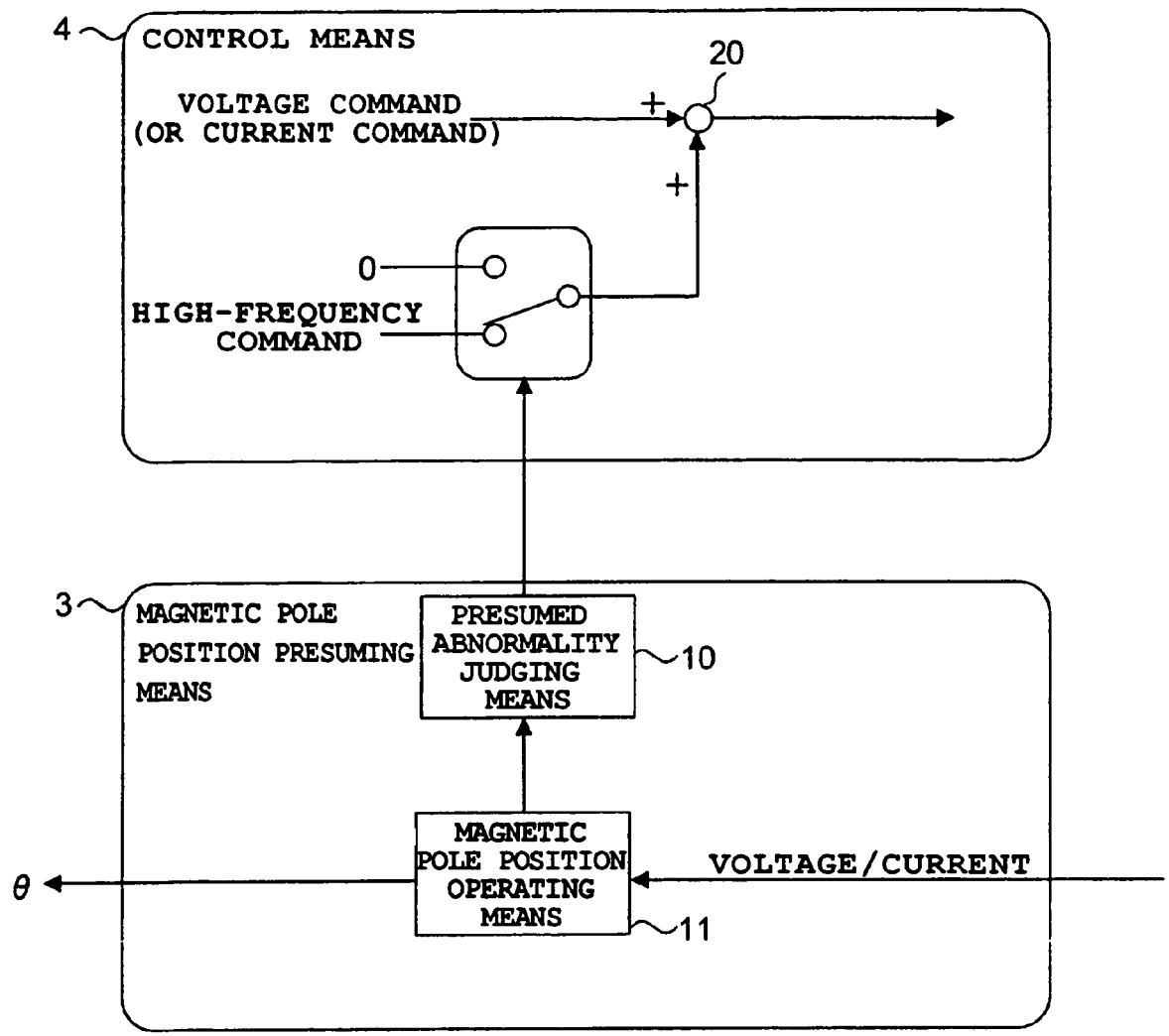
FIG. 7 is a block diagram showing the construction of a main part of a second embodiment of this invention.

That is, as shown in FIG. 7, in the control system for a synchronous machine in this embodiment, a presumed abnormality judging means 10 is added in the magnetic pole position presuming means 3. The presumed abnormality judging means 10 monitors the process or the result of the operation of presumed magnetic pole position operated in a magnetic pole position operating means 11 of the magnetic pole position presuming means 3, detects whether the presumed result is normal or abnormal before or after the presuming operation, and operates to input a high-frequency command to the adder 20 when it is detected that the presumed result is abnormal.

In the control system according to this embodiment thus constructed, a high-frequency command can be superposed only when the presumed result of the magnetic pole position is abnormal or expected to become abnormal.

A pseudo-inverse matrix for a matrix of the high-frequency current is operated in the presuming operation process. If no 2×2 inverse matrix in the pseudo-inverse matrix exists, the presuming operation becomes impossible, and thus, the abnormality of the presumed result can be judged. Here, whether or not the inverse matrix operation exists can be judged by whether a determinant of matrix is 0 or not.

Further, even when the determinant of matrix is not 0, it is considered that the operation result may become abnormal for some disturbance. In such the case, if there is a large error when compared with the last presumed result, the operation result may be judged to be abnormal.

According to this embodiment, when the presumed operation result becomes abnormal, it becomes possible to avoid the state wherein the presuming operation becomes impossible or to recover from the state by superposing the high-frequency command effectively.

That is, when the presumed operation result is normal, the high-frequency command is not superposed and the magnetic pole position θ presumed in the magnetic pole position presuming means 3 is input to the control means 4 for the PWM control of the synchronous machine 2. But, when the presumed operation result is abnormal, the high-frequency command is superposed so that the presuming operation result becomes normal. As a result of such control, the magnetic pole position θ presumed in the magnetic pole position presuming means 3 based on the output voltage or the output current after such the control is input to the control means 4 for the PWM control of the synchronous machine 2.

Third Embodiment

Next, a control system for a synchronous machine according to a third embodiment of this invention will be explained referring to FIG. 8. Further, the same components as those shown in the second embodiment will be assigned with the same reference numerals and duplicated explanation thereof will be omitted.

Figure 8:
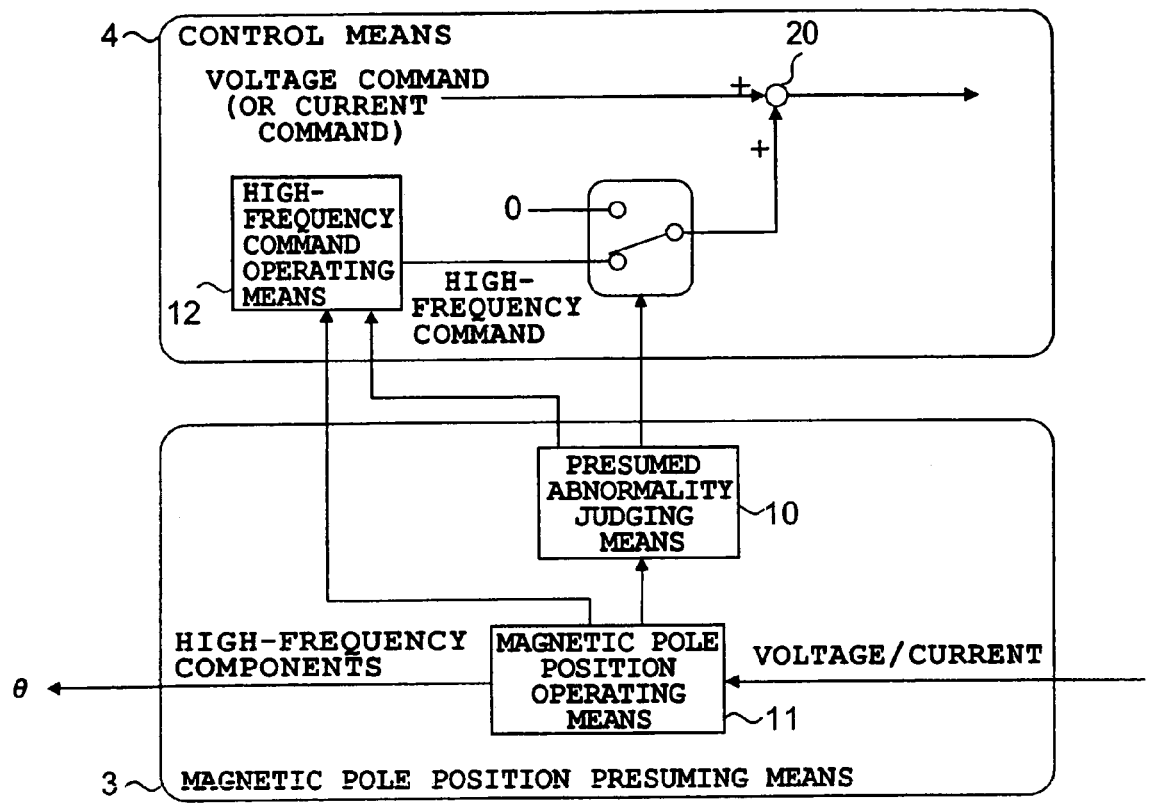
FIG. 8 is a block diagram showing the construction of a main part of a third embodiment of this invention.

That is, as shown in FIG. 8, in the control system for a synchronous machine in this embodiment, a high-frequency command operating means 12 is added in the control means 4. The presumed abnormality judging means 10 monitors the process or the result of the operation of the presumed magnetic pole position operated by the magnetic pole position operating means 11 in the magnetic pole position presuming means 3, detects whether or not the presuming operation is abnormal, and operates so that the high-frequency command operating means 12 inputs a high frequency command to the adder 20 so as to avoid the state wherein the presuming operation is abnormal or to recover from the state when it is detected that the presuming operation is abnormal.

The high-frequency command generated from the high-frequency command operating means 12 which is capable of avoiding the state wherein the presuming operation is abnormal or recovering from the state is a command described below. When the high-frequency components used in the presuming operation have values higher than a specified value, the high-frequency command operating means 12 generates a high-frequency command so that the high-frequency components spatially at least in the direction orthogonal to the high-frequency components used in the presuming operation are contained. Thus, the high-frequency components are contained at least in the direction orthogonal to the high-frequency components of the voltage or the current used in the presuming operation by the magnetic pole position presuming means 3.

Further, when the high-frequency components used in the presuming operation are below a prescribed value, the high-frequency command operating means 12 generates a high-frequency command, irrespective of these high-frequency components so that two or more vectors that are spatially linearly independent and have values above the specified value are contained. As a result of this operation, the high-frequency components of the voltage or the current used in the presuming operation of the magnetic pole position presuming means 3 become two or more vectors that are above the specified value and spatially linearly independent.

In this embodiment thus constructed, when the presuming operation result is abnormal or expected to become abnormal, it is possible to superpose a high-frequency command so that the high-frequency components are contained in the direction spatially orthogonal to high-frequency components used in the presuming operation when the high-frequency components used in the presuming operation are above the prescribed value, or a high-frequency command so that the linearly independent two or more vectors having values above the prescribed value are generated when the high-frequency components used in the presuming operation are below the prescribed value.

That is, when the presuming operation result is normal, the high-frequency command is not superposed and the magnetic pole position θ presumed in the magnetic pole position presuming means 3 is input to the control means 4 for the PWM control of the synchronous machine 2. But, when the presuming operation result is abnormal or expected to become abnormal, the high-frequency command is superposed so that the presuming operation result becomes normal. As a result of such control, the magnetic pole position θ presumed in the magnetic pole position presuming means 3 based on the output voltage or the output current after such the control is input to the control means 4 for the PWM control of the synchronous machine 2.

Out of the abnormality judging method of the presumed result explained in the second embodiment, the judging as to whether the determinant of the 2×2 matrix used in the operation is 0 or not is equivalent to the discrimination as to whether the high-frequency components used in the presuming operation is linearly dependent or not. If linearly dependent, it is sufficient to operate and superpose a high-frequency command so that the high-frequency components do not become linearly dependent as described above. In other words, when the obtained high-frequency components have values above a prescribed value, a high-frequency command is operated and superposed so as to contain the high-frequency components at least in the direction orthogonal to the obtained high-frequency components, or when the obtained high-frequency components have values below the prescribed value, a high-frequency command that makes two or more linearly dependent vectors having values above the specified value is operated and superposed. Thus, even when some disturbance or operation error is generated, linearly dependent high-frequency components can be surely obtained and it becomes possible to avoid the state wherein the presuming operation is abnormal or recover from the state effectively.

Further, in the above explanation, based on the judged result of the presumed abnormality judging means 10 in the second embodiment, the high-frequency command operation is made by the high-frequency command operating means 12 and thus the high-frequency command is superposed. However, it is also possible to operate a high-frequency command by the high-frequency command operating means 12 similarly based on the judged result of the output voltage/current region judging means 9 in the first embodiment and superpose the high-frequency command.

Further, this invention is not limited to the above-described embodiments wherein the output voltage/current region judging means 9 or the presumed abnormality judging means 10 is used. Even in the case that the output voltage or the output current from the inverter 1 is detected, and when no high-frequency component is detected in the output voltage or the output current from the inverter 1 or when the linearly independent condition is not satisfied even when the high-frequency components are detected, it is possible to operate and superpose a high-frequency command similarly as described in the above-described embodiment. That is, when no high-frequency component is detected in the output voltage or the output current; in other words, when the high-frequency components in the output voltage or the output current used in the presuming operation are below a prescribed value, it is sufficient to operate and superpose a high-frequency command so that the high-frequency components of the voltage or the current have values above the prescribed value and more than two vectors are obtained which are spatially linearly independent. And even when the high-frequency components are detected in the output voltage or the output current; in other words, even if the high-frequency components in the voltage or the current used in the presuming operation are above the prescribed value, if no vector satisfying the linearly independent condition is contained, it is sufficient to operate and superpose a high-frequency command so that the high-frequency components of the voltage or the current are included at least in the direction spatially orthogonal to the high-frequency components of the voltage or the current used in the presuming operation.

Furthermore, in the above-described embodiments, it is described that the high-frequency commands are operated and superposed for the control of the synchronous machine, but it is not described how to provide or operate such the high-frequency commands. Further, it is not described how to construct the high-frequency command operating means in the third embodiment. However, we believe that it is well known to those skilled in the art how to provide or operate such the high-frequency commands or to construct the high-frequency command operating means based on the above-description of the embodiments, so that detailed description thereof may be omitted.

Further, the explanation described in the second and third embodiments is made for the case that the synchronous machine 2 is a synchronous motor. When the synchronous machine 2 is a synchronous generator, the explanation can be applied similarly by regarding the inverter 1 as a rectifier.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for a synchronous machine, comprising:
    a converter for converting DC voltage to AC voltage or AC voltage to DC voltage;
    said synchronous machine being driven by said converter;
    a magnetic pole position presuming device for performing a presuming operation to presume a magnetic pole position of said synchronous machine based on high-frequency components of a voltage applied to said synchronous machine and a current flowing into said synchronous machine; and
    a control device for controlling said converter based on said magnetic pole position presumed by said magnetic pole position presuming device;
    said control device controlling said converter so as to include high-frequency components of a voltage or a current spatially in the direction at least orthogonal to said high-frequency components of said voltage or said current used in said presuming operation when no vector satisfying the linearly independent condition is contained in said high-frequency components of said voltage or said current used in said presuming operation.

2. The control system for a synchronous machine according to claim 1, wherein:
    said magnetic pole position presuming device includes a presumed abnormality judging device for judging whether or not said presuming operation is abnormal;
    said control device includes a high frequency command operating device for generating a high-frequency command based on a judged result of said presumed abnormality judging device, for controlling said converter so as to include high-frequency components of said voltage or said current spatially in the direction at least orthogonal to said high-frequency components of a voltage or a current used in said presuming operation when no vector satisfying the linearly independent condition is contained in said high-frequency components of said voltage or said current used in said presuming operation, or such that said high-frequency components of said voltage or said current used in said presuming operation become two or more vectors which are spatially linearly independent and have values above a specified value when said high-frequency components of said voltage or said current used in said presuming operation are below said specified value; and
    said control device is controlled by said high-frequency command.

3. A control system for a synchronous machine, comprising:
    a converter for converting DC voltage to AC voltage or AC voltage to DC voltage;
    said synchronous machine being driven by said converter;
    a magnetic pole position presuming device for performing a presuming operation to presume a magnetic pole position of said synchronous machine based on high-frequency components of a voltage applied to said synchronous machine and a current flowing into said synchronous machine; and
    a control device for controlling said converter based on said magnetic pole position presumed by said magnetic pole position presuming device;
    said control device controlling said converter so as to contain significant high-frequency components in said voltage or said current used in said presuming operation when a mean voltage or a mean current output from said converter is spatially in a region close to a straight line containing starting and ending points of non-zero voltage vector output from said converter, wherein:

said control device includes an output voltage/current region judging device for judging whether or not said mean voltage or said mean current output from said converter is spatially in said region close to said straight line containing starting and ending points of non-zero voltage vector output from said converter; and said control device controls said converter based on a judged result of said output voltage/current region judging device, so as to include high-frequency components of a voltage or a current spatially in the direction at least orthogonal to said high-frequency components of said voltage or said current used in said presuming operation, or such that said high-frequency components of said voltage or said current used in said presuming operation become two or more vectors which are spatially linearly independent and have values above a specified value.

4. A control system for a synchronous machine, comprising:

a converter for converting DC voltage to AC voltage or AC voltage to DC voltage;

said synchronous machine being driven by said converter;

a magnetic pole position presuming device for performing a presuming operation to presume a magnetic pole position of said synchronous machine based on high-frequency components of a voltage applied to said synchronous machine and a current flowing into said synchronous machine; and a control device for controlling said converter based on said magnetic pole position presumed by said magnetic pole position presuming device;

said control device controlling said converter so as to contain significant high-frequency components in said voltage or said current used in said presuming operation when said magnetic pole position presuming device detects that said presuming operation is abnormal, wherein:

said magnetic pole position presuming device includes a presumed abnormality judging device for judging whether or not said presuming operation is abnormal; and said control device controls said converter based on a judged result of said presumed abnormality judging device, so as to include high-frequency components of a voltage or a current spatially in the direction at least orthogonal to said high-frequency components of said voltage or said current used in said presuming operation, or such that said high-frequency components of said voltage or said current used in said presuming operation become two or more vectors which are spatially linearly independent and have values above a specified value.

5. A control system for a synchronous machine, comprising:

a converter for converting DC voltage to AC voltage or AC voltage to DC voltage;

said synchronous machine being driven by said converter;

a magnetic pole position presuming device for performing a presuming operation to presume a magnetic pole position of said synchronous machine based on high-frequency components of a voltage applied to said synchronous machine and a current flowing into said synchronous machine; and a control device for controlling said converter based on said magnetic pole position presumed by said magnetic role position presuming device;

said control device controlling said converter such that said high-frequency components of said voltage or said current used in said presuming operation become two or more vectors which are spatially linearly independent and have values above a specified value when said high-frequency components of said voltage or said current used in said presuming operation are below said specified value, wherein:

said magnetic pole position presuming device includes a presumed abnormality judging device for judging whether or not said presuming operation is abnormal;

said control device includes a high frequency command operating device for generating a high-frequency command based on a judged result of said presumed abnormality judging device, for controlling said converter so as to include high-frequency components of said voltage or said current spatially in the direction at least orthogonal to said high-frequency components of a voltage or a current used in said presuming operation when no vector satisfying the linearly independent condition is contained in said high-frequency components of said voltage or said current used in said presuming operation, or such that said high-frequency components of said voltage or said current used in said presuming operation become two or more vectors which are spatially linearly independent and have values above a specified value when said high-frequency components of said voltage or said current used in said presuming operation are below said specified value; and said control device is controlled by said high-frequency command.

* * * * *